(12) United States Patent
Takahashi

(10) Patent No.: US 7,217,016 B2
(45) Date of Patent: May 15, 2007

(54) LAMP MOUNTING APPARATUS

(75) Inventor: Toshihide Takahashi, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 211 days.

(21) Appl. No.: 10/667,372

(22) Filed: Sep. 23, 2003

(65) Prior Publication Data

US 2004/0070986 A1 Apr. 15, 2004

(30) Foreign Application Priority Data

Sep. 24, 2002 (JP) ............................. 2002-276670

(51) Int. Cl.
*F21V 14/04* (2006.01)

(52) U.S. Cl. .................. 362/459; 362/525; 362/528; 362/515; 362/523

(58) Field of Classification Search ................ 362/546, 362/549, 515, 528, 289, 523, 525
See application file for complete search history.

(56) References Cited

U.S. PATENT DOCUMENTS

| 4,318,161 | A | * | 3/1982 | Shanks ........................ 362/656 |
| 4,539,626 | A | * | 9/1985 | Hawlitzki et al. ........... 362/549 |
| 5,014,165 | A | * | 5/1991 | Naganawa ................... 362/520 |
| 5,428,519 | A | * | 6/1995 | Salmon et al. .............. 362/421 |
| 5,496,006 | A | * | 3/1996 | Kulka et al. ............. 248/231.9 |
| 6,511,215 | B2 | * | 1/2003 | Hashigaya ................... 362/515 |
| 6,540,386 | B2 | * | 4/2003 | Fujino et al. ................ 362/525 |
| 6,871,989 | B2 | * | 3/2005 | Nakazawa et al. .......... 362/515 |

FOREIGN PATENT DOCUMENTS

JP  11-48856 A  2/1999

* cited by examiner

*Primary Examiner*—Sandra O'Shea
*Assistant Examiner*—Anabel Ton
(74) *Attorney, Agent, or Firm*—Birch, Stewart, Kolasch & Birch, LLP

(57) ABSTRACT

A lamp mounting apparatus engages a temporal fastening pin with a temporal fastening clip to prevent a positioning surface of a lamp unit from moving in such a direction as to depart from a flange, so that the lamp unit can be kept positioned.

9 Claims, 7 Drawing Sheets

LAMP MOUNTING APPARATUS

CROSS-REFERENCE TO THE RELATED APPLICATION

The application incorporates by reference the subject matter of Application No. 2002-276670 filed in Japan on Sep. 24, 2002, on which a priority claim is based under 35 U.S.C. § 119(a).

BACKGROUND OF THE INVENTION (1) Field of the Invention

The present invention relates to a lamp mounting apparatus that can improve appearance quality of a vehicle.

(2) Description of the Related Art

In the case where a lamp unit is disposed adjacent to an outer panel member that defines a part of the outer surface of a vehicle, the lamp unit is positioned with respect to the outer panel member and then fixed to the vehicle body at a predetermined location thereof using bolts or the like so that the appearance quality of the vehicle can be improved. Accordingly, the lamp unit is provided with a positioning projection, and the outer panel member is provided with a positioning opening. The lamp unit is also provided with a temporal fastening member that temporarily fastens the main body of the lamp unit to a frame member of the vehicle in a state in which the lamp unit is positioned with its positioning projection being inserted into the positioning opening.

For example, a lamp mounting apparatus that keeps a lamp unit positioned has been disclosed in Japanese Laid-Open Patent Publication (Kokai) No. 11-48856.

This lamp mounting apparatus, however, positions the lamp unit on an outer panel member only in the direction of the vehicle width, and hence the lamp unit cannot be positioned in a satisfactory manner.

SUMMARY OF THE INVENTION

It is therefore an object of the present invention to provide a preferable lamp mounting apparatus.

To attain the above object, the present invention provides a lamp mounting apparatus that comprises an outer panel member mounted on a frame member of a vehicle to define a part of an outer surface of the vehicle; a lamp unit disposed adjacent to the outer panel member; a positioning projection protruding from one of the outer panel member and the lamp unit; a positioning opening formed in the other one of the outer panel member and the lamp unit, and into which the positioning projection can be; positioning abutment parts provided in respective ones of the lamp unit and the outer panel member, and abut on each other with the positioning projection being inserted into the positioning hole, to thereby position the lamp unit at a predetermined location in a protruding direction of the positioning projection; a first temporal fastening member protruding from one of the lamp unit and the frame member, and having a plurality of engaged parts arranged in a connected row arrangement in the protruding direction of the positioning projection; and a second temporal fastening member provided in the other one of the lamp unit and the frame member, and having engaging parts adapted to be engaged with the engaged parts of the first temporal fastening member.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE INVENTION

The present invention will now be described in detail with reference to the accompanying drawings showing an embodiment thereof.

Figure 1:
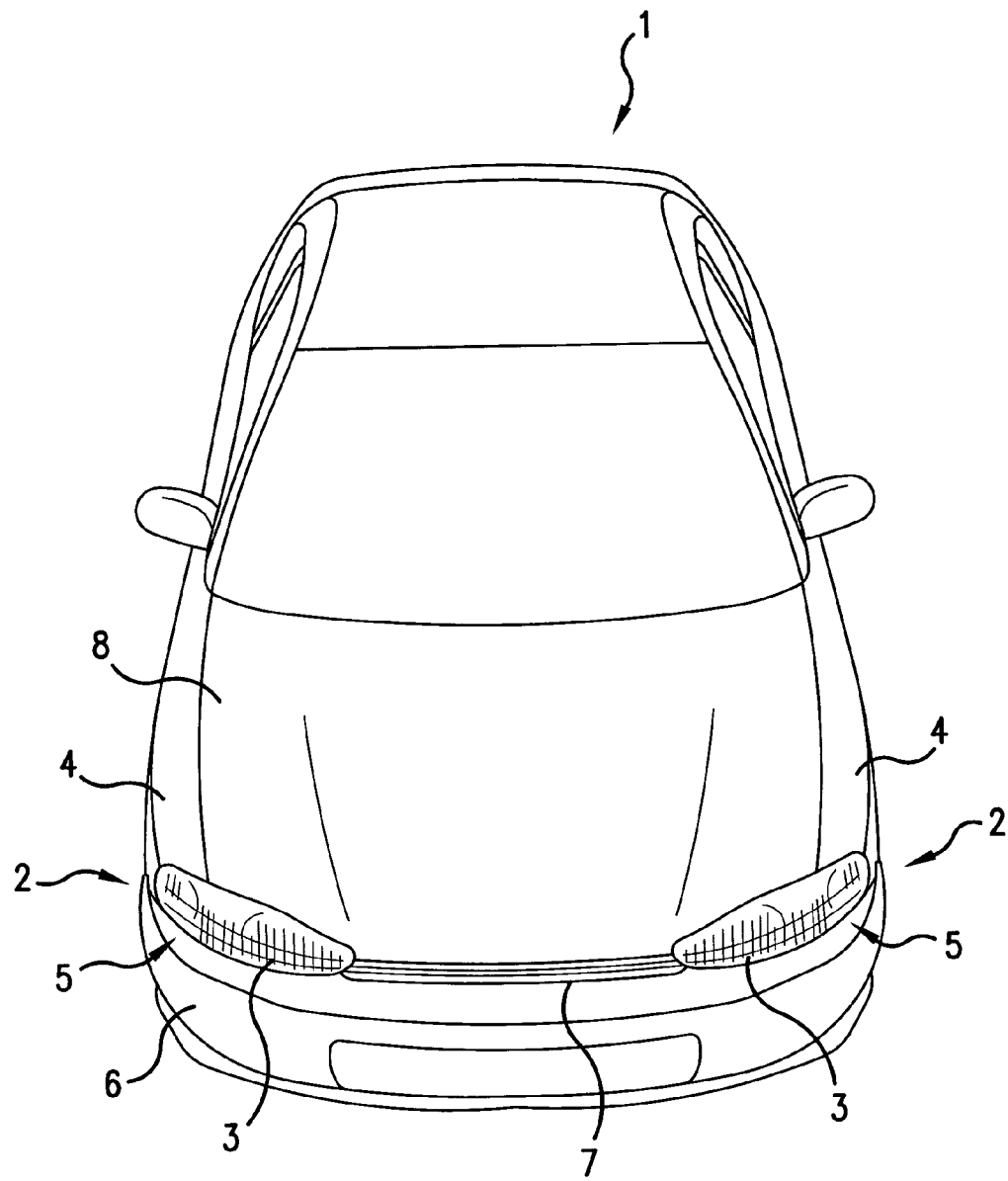
FIG. 1 is a perspective view showing a vehicle to which a lamp mounting apparatus according to an embodiment of the present invention is applied.

FIG. 1 shows a vehicle 1 to which a lamp mounting apparatus according to an embodiment of the present invention is applied. As shown in FIG. 1, right and left lamp units 3 are arranged at respective front corners 2 of the vehicle 1. The lamp units 3 extend from the front of the vehicle 1 toward right and left outer panel members, that is, front fenders 4, such that the surfaces of the lamp units 3 are flush with the front fenders 4. Thus, a front corner surface, comprised of a lens plane of the lamp unit 3 and a surface of the front fender 4, is formed as a smooth surface at each of the right and left front corners 2. It should be noted that the vehicle 1, to which the lamp mounting apparatus for a vehicle according to the present embodiment is applied, is not limited to a passenger vehicle as shown in FIG. 1.

Figure 2:
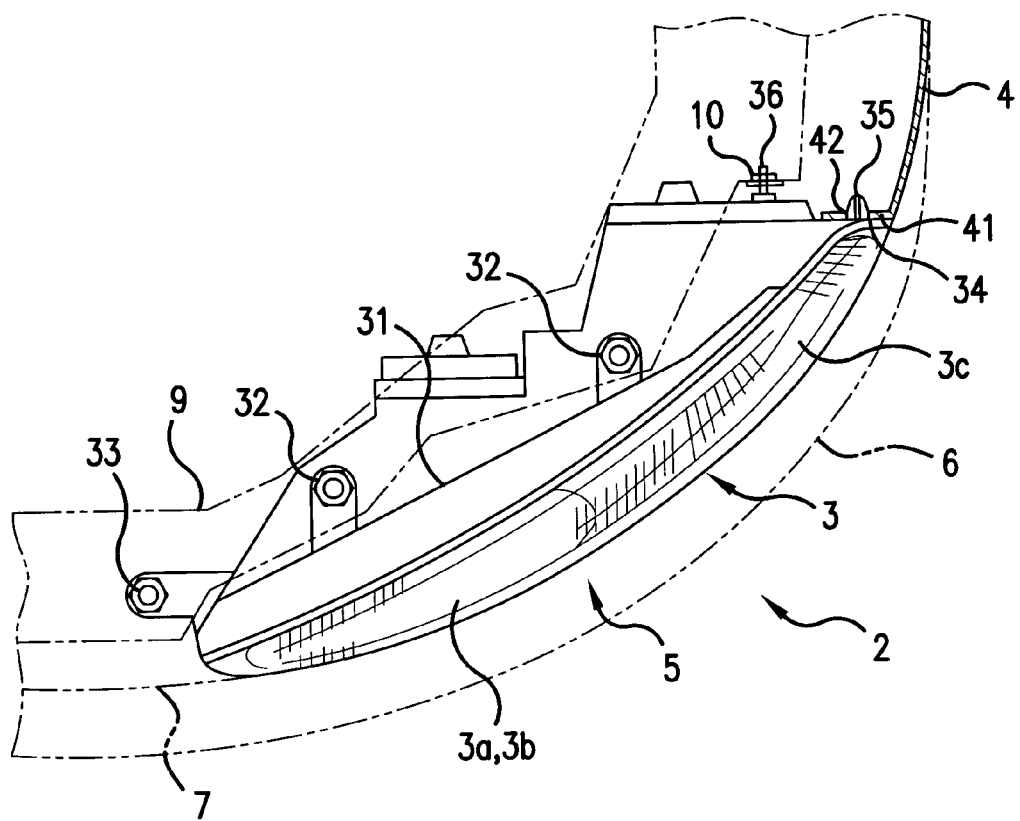
FIG. 2 is a view showing a lamp unit mounted in a lamp housing part of the vehicle.

Each of the lamp units 3 is disposed in a lamp housing part 5 that is opened in the above-described front corner surface. The lamp housing part 5 is surrounded by the front fender 4, a bumper 6, a front grille 7, and a hood 8. FIG. 2 is an enlarged top view showing the front corner 2 on the left side of the vehicle, in which component parts, except for the hood 8, that forms the lamp housing part 5 are illustrated as being exposed.

The lamp unit 3 is a front combination lamp unit comprised of a headlamp 3a, a clearance lamp 3b, and a front turn signal lamp 3c, configured as an integral unit (refer to FIG. 2). The headlamp 3a and the clearance lamp 3b project light toward the front of the vehicle 1, and the front turn signal lamp 3c is projects light toward the side of the vehicle 1. It should be noted that the lamp unit 3 is not limited to the combination lamp as described above, but may be a lamp unit comprised of an auxiliary lamp such as a fog lamp or a cornering lamp.

As shown in FIG. 2, the lamp unit 3 is formed at a front corner 2 of the vehicle 1 in a manner extending from an end of the front grille 7 toward the front fender 4 in the lateral direction of the vehicle. A lamp housing 31 of the lamp units 3 is provided with two upper brackets 32, 32 protruding from the top of the housing 31. A side bracket 33 protrudes from one end of the front grille 7. The side bracket 33 and the upper brackets 32, 32 abut a frame member 9 of the vehicle 1 from above the frame member 9 and are bolted to the frame member 9.

A positioning surface 34 is formed at an end of the lamp housing 31 adjacent to the front fender, and abuts on a flange 41 of the front fender 4. A positioning projection 35 is formed on the positioning surface 34 of the lamp housing 31, and is inserted into a positioning hole 42 of the front fender 4. Further, the lamp housing 31 is provided with a temporal fastening pin 36 (a first temporal fastening member), and is engaged with a temporal fastening clip 10 (a second temporal fastening member).

Figure 3:
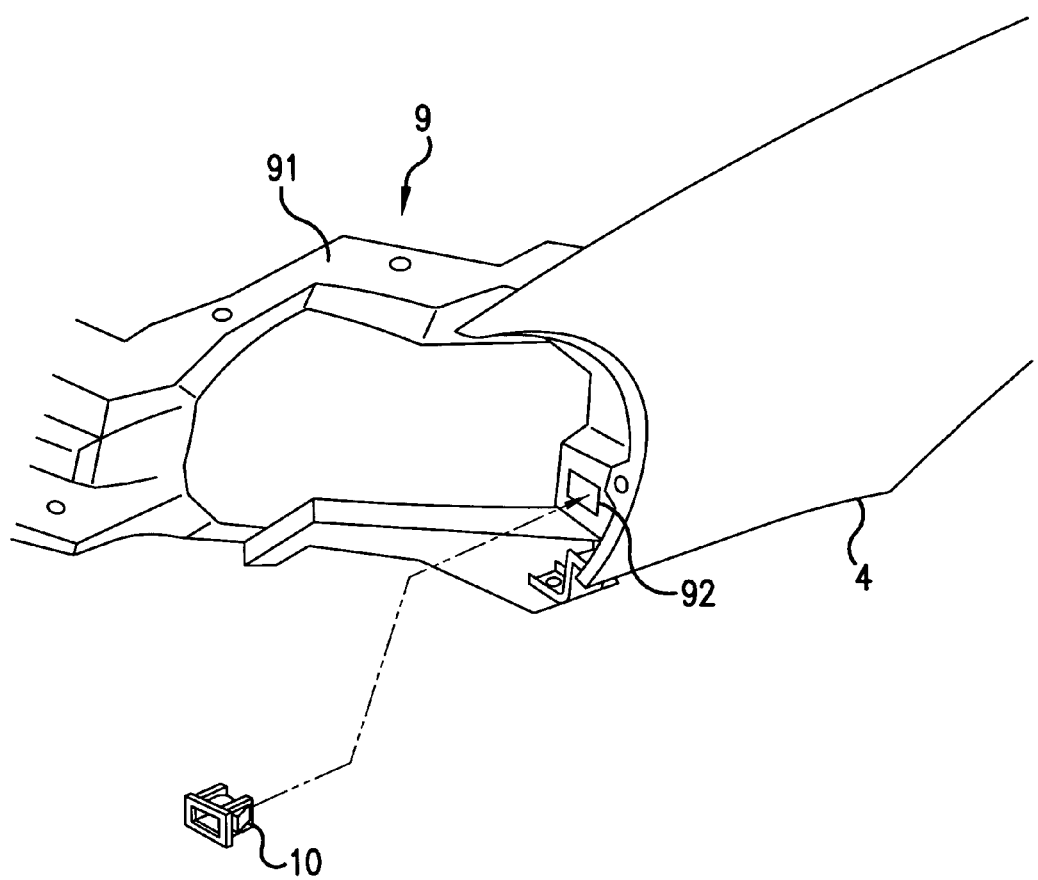
FIG. 3 is a perspective view showing a front end of a front fender and a frame member.

As shown in FIGS. 2 and 3, the front fender 4 is bolted onto the frame member 9 of the vehicle at predetermined locations thereof. Note that the front fender 4 may be mounted onto the frame member 9 by welding or the like. At the front end of the front fender 4, the flange 41 protruding into the lamp housing part 5 is formed integrally with the side edge of an opening of the lamp housing part 5. The flange 41 is provided with the positioning hole 42 directed toward the front of the vehicle 1.

The frame member 9 is formed by welding and fixing a plurality of plates to each other, and is comprised of a frame 91 surrounding the lamp housing part 5. Nuts, not shown, are welded to a lower surface of the upper part of the frame 91 of the frame member 9, and bolts for fastening the upper brackets 32 are screwed into the nuts. A nut, not shown, is welded to a lower surface of the side end of the frame 91 on the front grill side, and a bolt for fastening the side bracket 33 is screwed into the nut. A rectangular hook hole 92 is formed in the side end of the frame 91 of the frame member 9 on the front fender side, and the temporal fastening clip 10 is fitted in the hook hole 92.

In a vehicle production line, the lamp unit 3 is mounted on the vehicle body after the vehicle body is assembled. On this occasion, the lamp unit 3 is engaged with the lamp housing part 5 through the front opening thereof, and positioned by the positioning projection 35, the positioning hole 42, the positioning surface 34, and the flange 41. The lamp unit 3 is then temporarily fastened to the frame member 9 by inserting the temporal fastening pin 36 into the temporal fastening clip 10. A detailed description will now be given of the structure for positioning and temporally fastening the lamp unit 3.

Figure 4:
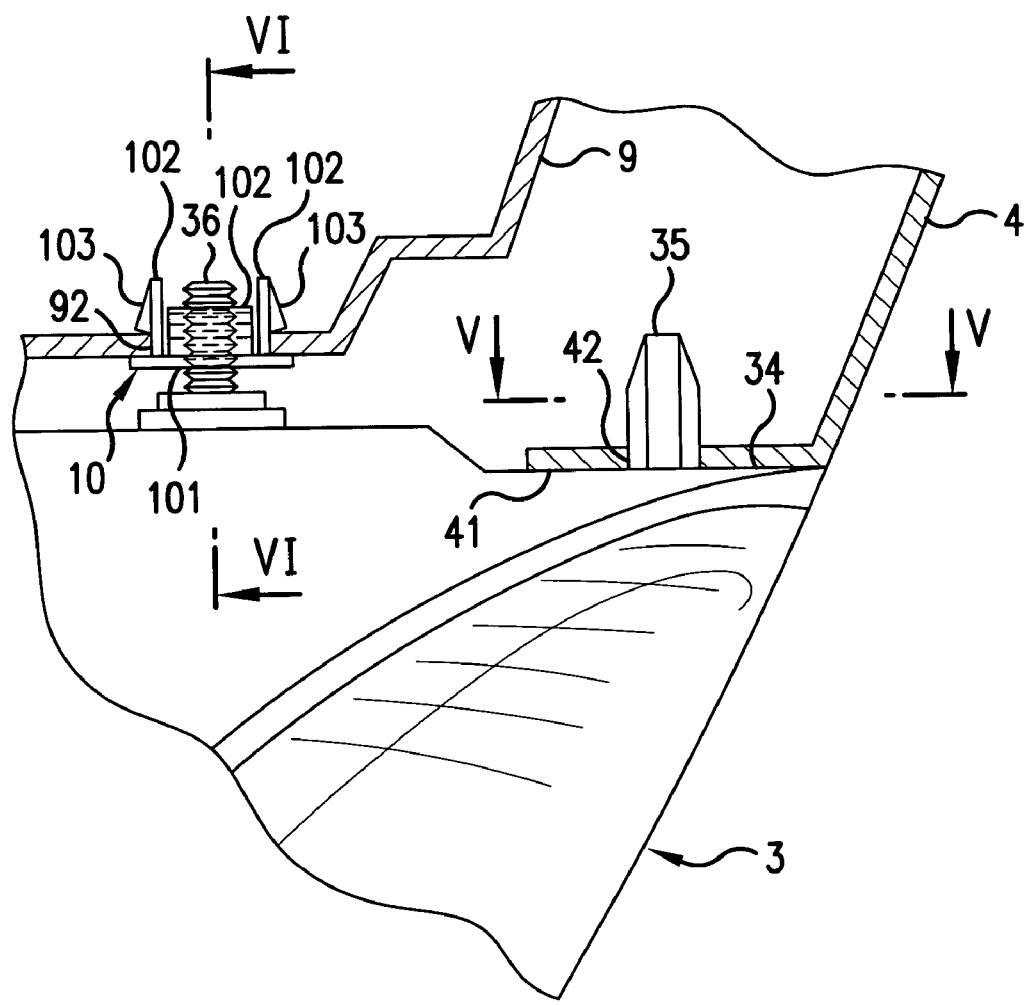
FIG. 4 is an enlarged view showing a fixed end of the lamp unit.

First, FIG. 4 is an enlarged view showing the periphery of the side end portion of the lamp unit 3 adjacent to the front fender 4. The positioning projection 35 and the temporal fastening pin 36 protrude horizontally from the lamp housing 31 of the lamp unit toward the rear of the vehicle body. The axes of the positioning projection 35 and the temporal fastening pin 36 are parallel with each other. The positioning projection 35, which is located closer to the side of the vehicle body than the temporal fastening pin 36, is fitted in the positioning hole 42 of the flange 41. The temporal fastening clip 10 is comprises a frame part 101 which is rectangular in shape as viewed from the front of the vehicle 1, and extending parts 102, 102, 102, 102 extending independently of each other toward the rear of the vehicle are formed at respective sides of the frame part 101. The extending parts 102, 102 formed at two sides of the frame part 101 in the direction of the vehicle width are comprised of respective claw parts 103, 103 which hooks onto both side edges of the hook hole 92. The extending parts 102, 102 formed at the two sides of the frame part 101 in the direction of the height of the vehicle 1 is formed with engaging parts 104, 104 (see FIG. 6) which oppose each other to sandwich the temporal fastening pin 36 therebetween from above and below.

Figure 5:
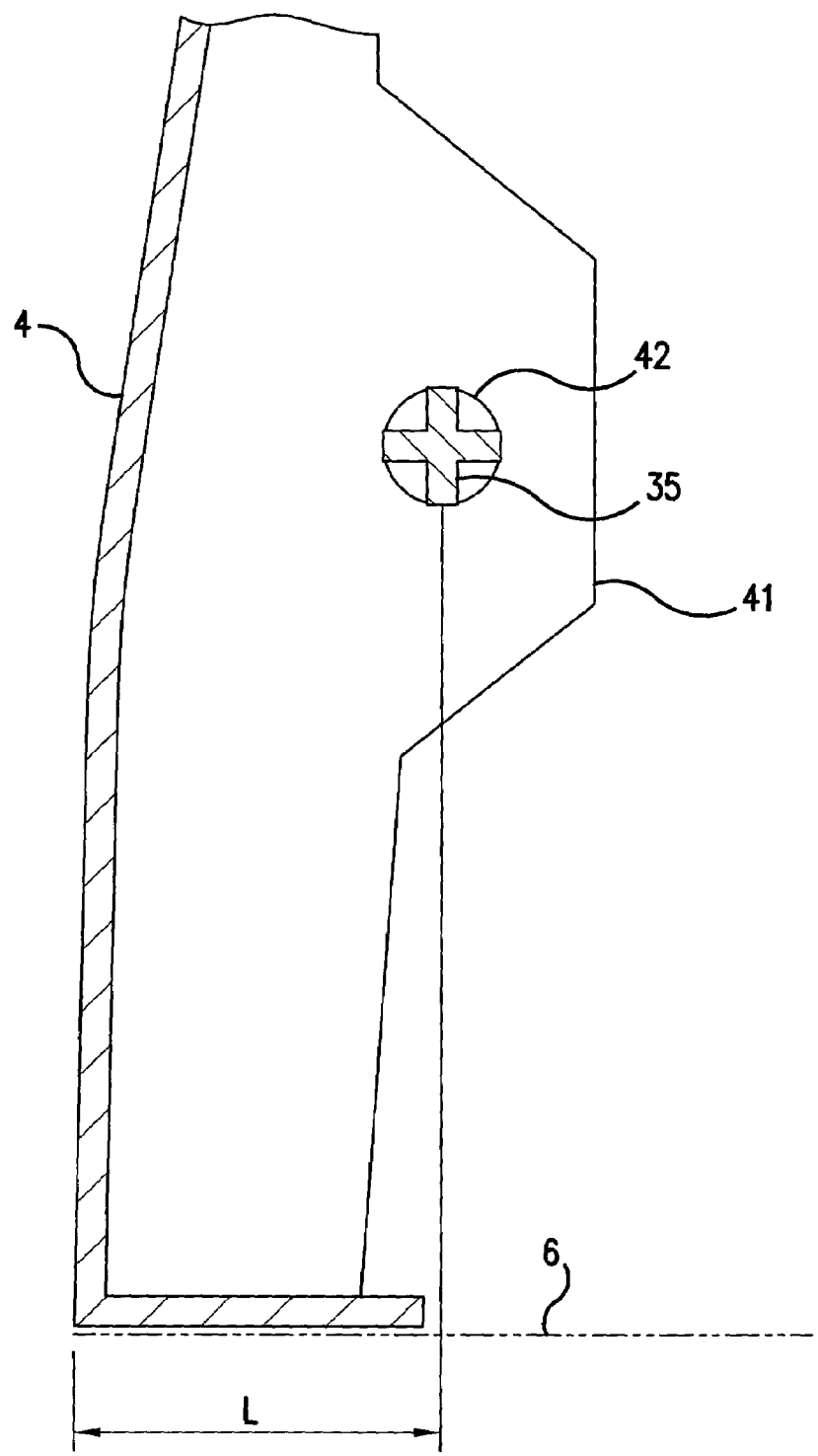
FIG. 5 is a cross-sectional view taken along line V—V in FIG. 4.

FIG. 5 is a cross-sectional view showing the positioning projection 35 as viewed from a line V—V in FIG. 4, and showing the details of a state in which the positioning projection 35 is fitted in the positioning hole 42 of the flange 41. As shown in FIG. 5, the positioning projection 35 is substantially cross-shaped at cross section, and right and left ends thereof are adjacent to the inner edge of the positioning hole 42. On the other hand, the positioning hole 42 is substantially round, and as viewed on cross section in FIG. 5, the upper, lower, right, and left ends of the positioning projections 35 are adjacent to the inner edge of the positioning hole 42. It should be noted that the positioning projection 35 is tapered at a slight angle from the base thereof toward the tip thereof. The positioning projection 35 is tapered at a greater angle at the tip thereof, and is thus guided into the positioning hole 42 from the tip thereof, so that the positioning projection 35 can be inserted smoothly into the positioning hole 42.

Therefore, even if the axis of the positioning projection 35 is deviated from the center of the positioning hole 42 in the directions of the height and width of the vehicle 1 when the lamp unit 3 is pressed into the lamp housing part 5 through the front opening thereof the deviation is corrected when the positioning projection 35 is inserted into the positioning hole 42 as described above. Then, after the positioning surface 34 abuts on the flange 41 to completely fit the positioning projection 35 into the positioning hole 42, the positioning projection 35 never deviates from the center of the positioning hole 42 in the directions of the height and width of the vehicle 1. On this occasion, as the positioning projection 35 is inserted into the positioning hole 42, the positioning projection 35 increases in width, so that the positioning projection 35 can be tightly fitted in the positioning hole 42 and prevented from being easily pulled out from the positioning hole 42.

At the front corner 2 of the vehicle body, the side edge of the lamp unit 3 and the side edge of the opening of the lamp housing part 5 are formed such that they are aligned with each other in a state in which the lamp unit 3 is disposed in the lamp housing part 5. On this occasion, as shown in FIG. 5, the positioning projection 35 is disposed at such a location that the center thereof is located at a predetermined distance L away from the lower end of the side edge of the lamp unit 3 in the horizontal direction of the vehicle. On the other hand, the positioning hole 42 is disposed at such a location that the center thereof is located at the predetermined distance L away from the lower end of the side edge of the opening of the lamp housing part 5 in the horizontal direction. Therefore, when the positioning projection 35 has been fitted into the positioning hole 42, the center of the positioning projection 35 and the center of the positioning hole 42 correspond to each other in the horizontal direction, so that the side edge of the lamp unit 3 and the side edge of the opening of the lamp housing part 5 can be perfectly aligned with each other.

Figure 6:
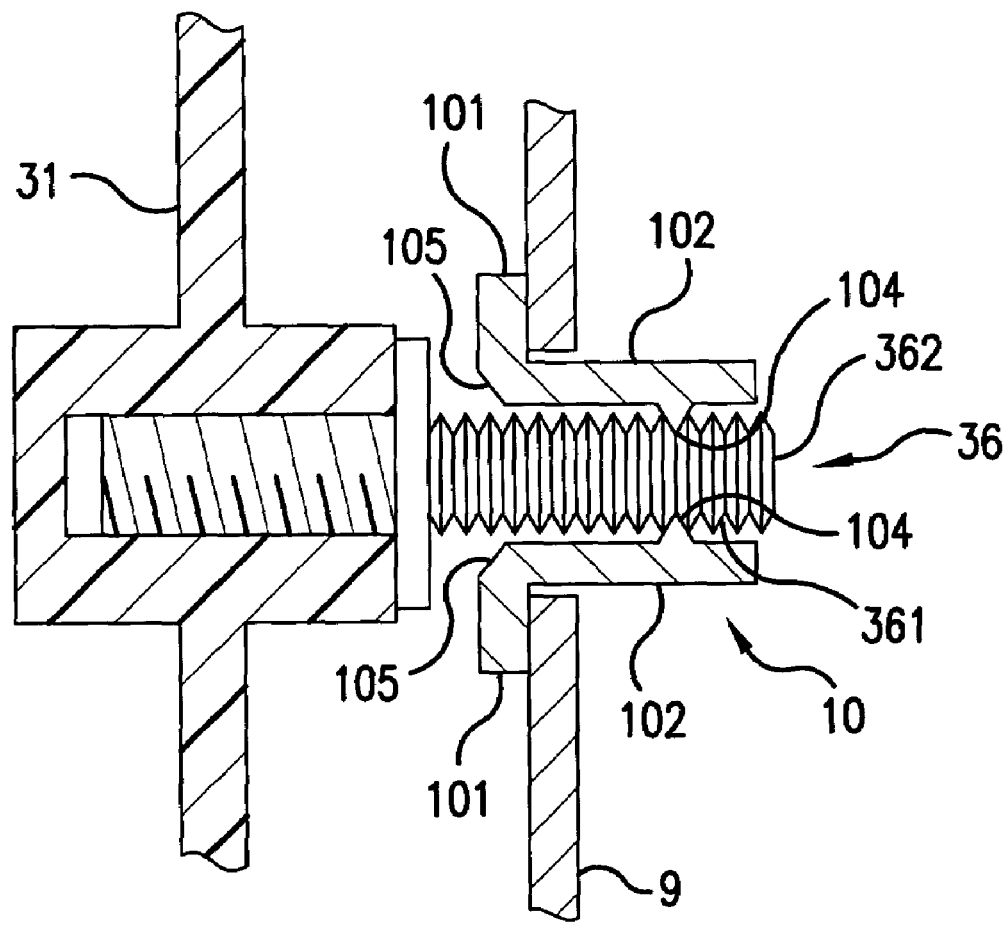
FIG. 6 is a cross-sectional view taken along line VI—VI in FIG. 4.

FIG. 6 is a cross-sectional view of the temporal fastening pin 36 and the temporal fastening clip 10 taken along line VI—VI in FIG. 4. As shown in FIG. 6, the temporal fastening pin 36 is a shaft-like member comprising a plurality of projections 361 formed on the outer circumference thereof in a manner extending in the circumferential direction thereof. The plurality of projections 361 are provided in a connected row arrangement in the axial direction of the temporal fastening pin 36, and function as parts to be engaged, with which the engaging parts 104 of the temporal fastening clip 10 engage. The temporal fastening pin 36 is fixed to the lamp unit 3 by screwing a thread thereof into a mounting boss of the lamp housing 31. Although in the present embodiment, it is assumed that the temporal fastening pin 36 is screwed into the lamp housing 31, but may be protruded integrally from the lamp housing 31.

As shown in FIG. 4, the temporal fastening clip 10 has the claws 103, 103 thereof hooked onto both side edges of the hook hole 92 of the frame member 9. Each of the extended parts 102, 102, 102, 102 formed at the respective sides of the frame part 101 is inserted into the hook hole 92, and as viewed in FIG. 6, the insertion vertical width thereof is set to be slightly smaller than the vertical width of the hook hole 92, so that the temporal fastening clip 10 can be slightly displaced in the vertical direction. As viewed in the cross-section shown in FIG. 6, the above-mentioned engaging parts 104, 104 are substantially triangular, and are engaged with the projections 361 in such a manner as to sandwich the projections 361 therebetween from above and below. Both of the engaging parts 104, 104 are extended to have the same shape at cross section in the direction of the vehicle width, and hence even if the axis of the temporal fastening pin 36 is slightly deviated from the center of the temporal fastening clip 10, the engaging parts 104, 104 can be engaged with the projections 361 of the temporal fastening pin 36. Further, an inclined surface 105 is formed along the peripheral edge of an opening formed in the front face of the frame part 101. It should be noted that the temporal fastening clip 10 is made of a polyacetal material, for example, to provide the extending parts 102, 102, 102, 102 with suitable elasticity.

Figure 7:
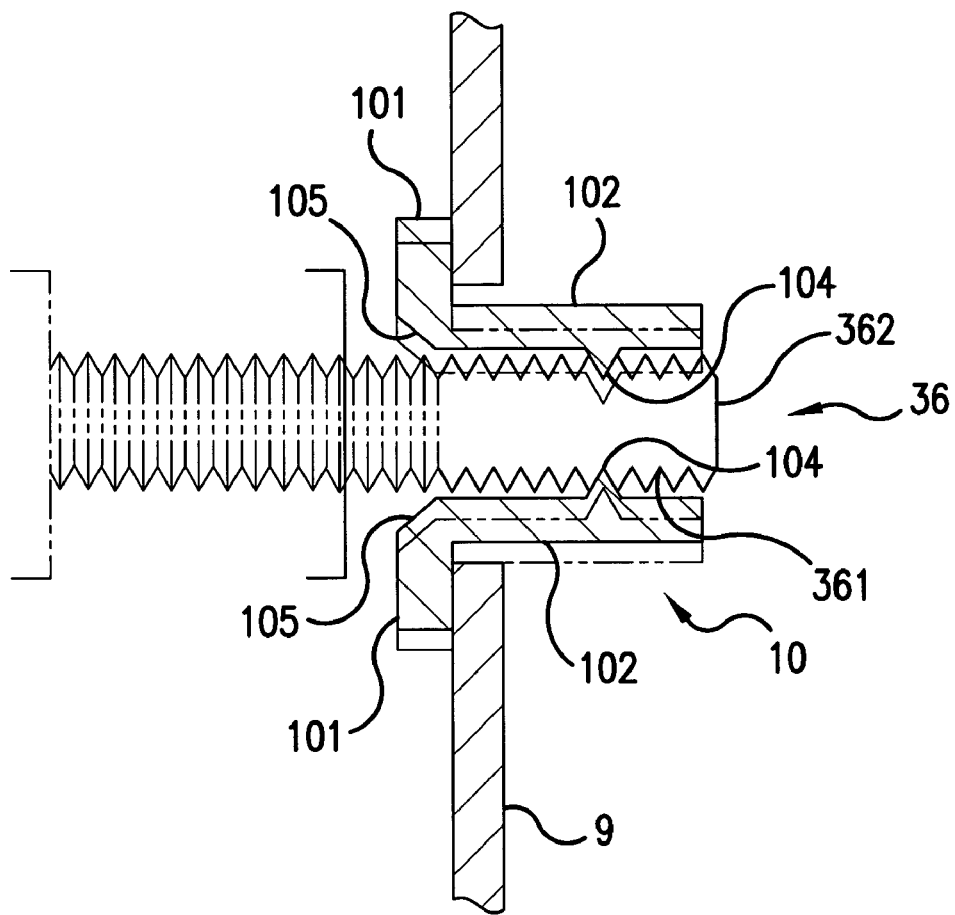
FIG. 7 is a view showing a state in which a temporal fastening pin is hooked onto a temporal fastening clip.

FIG. 7 illustrates a state in which the temporal fastening pin 36 is hooked on the temporal fastening clip 10 when the lamp unit 3 is temporarily fastened onto the frame member 9. When the lamp unit 3 is pressed into the lamp housing part 5 through the front opening, and the positioning projection 35 is inserted into the positioning hole 42, a head 362 of the temporal fastening pin 36 is abutted on the inclined surface 105 of the frame part 101 in the temporal fastening clip 10 first, and then presses the inclined surface 105 to displace the temporal fastening clip 10 upward, so that the temporal fastening pin 36 is inserted into the opening of the frame part 101. As the lamp unit 3 is further pressed into the lamp housing part 5, the temporal fastening pin 36 is inserted between the engaging parts 104, 104 in such a manner as to push the upper and lower extended parts 102, 102 outwardly. As the lamp unit 3 is pressed into the lamp housing part 5 against the elastic force of the upper and lower extended parts 102, 102, the temporal fastening pin 36 moves inside the temporal fastening clip 10 toward the rear of the vehicle 1 while being repeatedly engaged with and disengaged from the projections 362 and the engaging parts 104, 104. When the positioning surface 34 of the lamp unit 3 abuts on the flange 41 of the front fender 4 to complete the positioning of the lamp unit 3, the temporal fastening pin 36 stops moving to complete the temporal fastening of the lamp unit 3 onto the frame member 9.

Thereafter, when the lamp unit 3 is fitted into the lamp housing part 5, the lamp unit 3 is temporarily fastened in the periphery of an end thereof due to the engagement between the temporal fastening pin 36 and the temporal fastening clip 10, and the above-mentioned upper brackets 32, 32 and the side brackets 33 are positioned in bolt holes at the same time, so that they can be easily fastened thereafter.

In this way, when fitting the lamp unit 3 into the lamp housing part 5, the positioning projection 35 is fitted into the positioning hole 42 until the positioning surface 34 abuts on the flange 41, so that the lamp unit 3 can be positioned with respect to the front fender 4 in the directions of the height and width of the vehicle 1 by means of the positioning projection 35 and the positioning hole 42, and the lamp unit 3 can be positioned with respect to the front fender 4 in the direction of the length of the vehicle 1 due to the engagement between the positioning surface 34 and the flange 41. Further, the engagement of the temporal fastening pin 36 with the temporal fastening clip 10 prevents the positioning surface 34 of the lamp unit 3 from moving in a direction to depart from the flange 41, and keep the lamp unit 3 positioned. Further, by pressing the lamp unit 3 into the lamp housing part 5 against the elastic force of the upper and lower extended parts 102, 102, the temporal fastening pin 36 moves inside the temporal fastening clip 10 toward the rear of the vehicle 1 while repeatedly engaging with and disengaging from the projections 361 and the engaging parts 104, 104. Therefore, even if the relative positions of the front fender 4 and the frame member 9 are not uniform in the direction of the length of the vehicle 1, the lamp unit 3 can be positioned with respect to the front fender 4 and temporarily fastened onto the frame member 9.

As described above, the lamp mounting apparatus according to the embodiment of the present invention temporarily fastens the lamp unit 3 onto the frame member 9 by positioning the lamp unit 3 on the front fender 4 in all of the directions of the height, width, and length of the vehicle 1, and keeps the lamp unit 3 positioned until the lamp unit 3 is fastened onto the frame member 9 by bolting or the like.

It is to be noted that the above-described way of positioning and fastening the lamp unit 3 is suitably applied to mechanical assembly process using industrial robots. Specifically, when the lamp unit 3 is mounted, the positioning projection 35 can be inserted smoothly into the positioning hole 42 even when the axis of the positioning projection 35 is slightly deviated from the center of the positioning hole 42 as described above. Further, even if the center of the temporal fastening clip 10 is slightly deviated from the axis of the temporal fastening pin 36, the head 362 of the temporal fastening pin 36 guides the temporal fastening clip 10 such that the temporal fastening pin 36 is inserted into the opening of the frame part 101 without fail. Therefore, it is unnecessary to finely adjust the positions of the temporal fastening clip 10 and the temporal fastening pin 36 when mounting the lamp unit 3.

It is to be understood that the present invention is not limited to the embodiment described above, but various variations of the above-described embodiment may be possible without departing from the spirits of the present invention. For example, the cross-section of the positioning projection 35 does not necessarily have to be cross-shaped as shown in FIG. 5, but may be round or oblong in shape. Further, in the above-described embodiment, the temporal fastening pin 36 has a circular cross-section, but may have square or the like cross-section.

Further, the positioning projection 35 may be formed on the flange 41, and the positioning hole 42 may be formed in the lamp housing 31. Further, the temporal fastening pin 36 may be formed on the frame member 9, and the temporal fastening clip 10 may be provided in the lamp housing 31. In this case, by fitting the lamp unit 3 into the lamp housing part 5 in the same manner as in the above-described embodiment, the lamp unit 3 can be positioned with respect to the front fender 4 and temporarily fastened onto the frame member 9.

Further, although in the above-described embodiment, the lamp unit 3 is mounted in the direction of the length of the vehicle 1, the lamp unit 3 may be mounted in the direction of the width of the vehicle 1, for example. In this case, the lamp unit 3 is positioned in three directions rotated at respective predetermined angles from three directions along the height, width, and length of the vehicle 1, and as a result, the lamp unit 3 can be positioned in the directions of the height, width, and length of the vehicle 1. Further, in the case where the lamp mounting apparatus according to the present invention is applied to a rear corner of a vehicle, the surface of the rear corner can be formed as a smooth surface as is the case with the above-described embodiment.

What is the claim is:

1. A lamp mounting apparatus, comprising:
   an outer panel member mounted on a frame member of a vehicle and defining a part of an outer surface of the vehicle;
   a lamp unit disposed adjacent to said outer panel member;
   a positioning projection protruding from one of said outer panel member and said lamp unit;
   a positioning opening formed in the other one of said outer panel member and said lamp unit, said positioning hole adapted to receive said positioning projection;
   positioning abutment parts provided in said lamp unit and said outer panel member, and said positioning abutment parts abut one another when said positioning projection has been inserted into said positioning hole, to thereby position said lamp unit at a predetermined location along a protruding direction of said positioning projection;
   a first temporal fastening member protruding from one of said lamp unit and said frame member, and having a plurality of engaged parts formed along the protruding direction of said positioning projection; and
   a second temporal fastening member provided in the other one of said lamp unit and said frame member, and having an engaging part adapted to engage with said engaged parts provided in said first temporal fastening member.

2. The lamp mounting apparatus according to claim 1, wherein said first temporal fastening member is a shaft-like member having a plurality of projections formed on an outer circumference thereof in a manner extending along a circumferential direction thereof.

3. The lamp mounting apparatus according to claim 2, wherein said second temporal fastening member includes an annular member having engaging parts adapted to engage with said projections of said first temporal fastening member, said engaging parts being formed on an inner circumferential surface of said second temporal fastening member.

4. The lamp mounting apparatus according to claim 3, wherein said positioning projection is tapered toward a tip thereof and said annular member is formed with an inclined surface in an opening thereof into which said shaft-like member is inserted, to guide said shaft-like member from the outer circumference toward the center of the opening.

5. The lamp mounting apparatus according to claim 1 wherein the engaging part of the second temporal fastening member includes two parts which oppose each other.

6. The lamp apparatus according to claim 1 wherein the second temporal fastening member is a clip.

7. The lamp mounting apparatus of claim 6 wherein the clip includes a frame part and extending parts.

8. The lamp mounting apparatus of claim 7 wherein the frame part is rectangular and the extending parts are located at two sides of the frame part.

9. The lamp mounting apparatus of claim 1 wherein the engaged parts of the first temporal fastening member extend along a total length of the first temporal fastening member.

* * * * *